United States Patent
Buehler et al.

(10) Patent No.: US 9,591,005 B2
(45) Date of Patent: Mar. 7, 2017

(54) AVIONICS INTRUSION DETECTION SYSTEM AND METHOD OF DETERMINING INTRUSION OF AN AVIONICS COMPONENT OR SYSTEM

(71) Applicant: GE Aviation Systems LLC, Grand Rapids, MI (US)

(72) Inventors: Eric Daniel Buehler, Grand Rapids, MI (US); Kevin Patrick Duffner, Ada, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 292 days.

(21) Appl. No.: 14/464,131

(22) Filed: Aug. 20, 2014

(65) Prior Publication Data

US 2016/0057160 A1 Feb. 25, 2016

(51) Int. Cl.
*H04L 29/06* (2006.01)
*G06F 11/00* (2006.01)

(52) U.S. Cl.
CPC .......... *H04L 63/1416* (2013.01); *H04L 63/20* (2013.01)

(58) Field of Classification Search
CPC ..... H04L 63/1416; H04L 63/20; H04L 67/12; H04L 63/1425; H04L 63/145; G06F 21/554; B64C 19/00; B64C 13/10
See application file for complete search history.

(56) References Cited

U.S. PATENT DOCUMENTS

| | | | | |
|---|---|---|---|---|
| 5,208,590 A | * | 5/1993 | Pitts | G01C 23/00 340/973 |
| 6,675,095 B1 | * | 1/2004 | Bird | G05D 1/0061 340/436 |
| 7,574,740 B1 | | 8/2009 | Kennis | |
| 8,402,268 B2 | | 3/2013 | Dierickx | |
| 8,612,581 B1 | * | 12/2013 | Craig | B64F 5/0045 709/224 |
| 2003/0027550 A1 | * | 2/2003 | Rockwell | B64D 45/0015 455/410 |
| 2003/0055540 A1 | * | 3/2003 | Hansen | B64D 45/0015 701/3 |
| 2003/0065428 A1 | * | 4/2003 | Mendelson | G05D 1/0055 701/9 |
| 2003/0084330 A1 | * | 5/2003 | Tarquini | H04L 63/1416 726/23 |
| 2003/0128122 A1 | * | 7/2003 | Reynolds | B64D 45/0015 340/573.1 |
| 2003/0225492 A1 | * | 12/2003 | Cope | G07C 5/008 701/33.4 |
| 2004/0107028 A1 | * | 6/2004 | Catalano | B64D 45/0015 701/2 |

(Continued)

*Primary Examiner* — Darren B Schwartz
(74) *Attorney, Agent, or Firm* — GE Global Patent Operation; William S. Munnerlyn

(57) ABSTRACT

A system for an aircraft and method of determining intrusion of an avionics component or system in an aircraft having multiple avionics components and systems communicating over an aircraft communications network monitored by a system, including monitoring, by the system, data communication over the aircraft communications network for at least some of the avionics components or system and comparing, by the system, the monitored communications for the at least some of the avionics components to corresponding operational profiles.

17 Claims, 5 Drawing Sheets

(56) References Cited

U.S. PATENT DOCUMENTS

| | | | |
|---|---|---|---|
| 2004/0267412 A1* | 12/2004 | Arnouse | B64D 45/0015 |
| | | | 701/2 |
| 2005/0022018 A1* | 1/2005 | Szor | H04L 63/145 |
| | | | 726/4 |
| 2005/0254654 A1* | 11/2005 | Rockwell | H04L 63/1416 |
| | | | 380/270 |
| 2005/0276228 A1* | 12/2005 | Yavatkar | H04J 3/14 |
| | | | 370/242 |
| 2007/0294768 A1 | 12/2007 | Moskovitch et al. | |
| 2008/0086554 A1* | 4/2008 | Royalty | H04L 63/1408 |
| | | | 709/224 |
| 2010/0174426 A1* | 7/2010 | Turung | G05D 1/0061 |
| | | | 701/11 |
| 2011/0247073 A1* | 10/2011 | Surasathian | G06F 21/554 |
| | | | 726/24 |
| 2013/0085672 A1* | 4/2013 | Stewart | G08G 5/003 |
| | | | 701/528 |
| 2013/0158751 A1* | 6/2013 | Cornell | G07C 5/008 |
| | | | 701/14 |
| 2014/0210648 A1* | 7/2014 | Samuthirapandian | G08G 5/0008 |
| | | | 340/961 |

* cited by examiner

AVIONICS INTRUSION DETECTION SYSTEM AND METHOD OF DETERMINING INTRUSION OF AN AVIONICS COMPONENT OR SYSTEM

BACKGROUND OF THE INVENTION

Contemporary aircraft may include a variety of systems to assist in flying the aircraft. Components or systems of each aircraft may be at risk from tampering including that an aircraft may be compromised without operator knowledge.

BRIEF DESCRIPTION OF THE INVENTION

In one aspect, an embodiment of the invention relates to a method of determining intrusion of an avionics component or system in an aircraft having multiple avionics components and systems communicating over an aircraft communications network monitored by a system, the method includes monitoring, by the system, data communication over the aircraft communications network for at least some of the avionics components or systems, comparing, by the system, the monitored communications for the at least some of the avionics components or systems to corresponding operational profiles, determining an intrusion for at least one of the avionics components or systems when the comparison indicates the at least one of the avionics components or systems satisfies an intrusion profile for the at least one of the avionics components or systems, and providing an alert of the determined intrusion.

In another aspect, an embodiment of the invention relates to an aircraft system for detecting intrusion into a component or system of an aircraft, which has multiple components and systems, including a system monitoring data from multiple systems of the aircraft and having a primary avionics purpose and a secondary security purpose wherein the system is configured to compare the monitored data for the at least some of the avionics components or systems to corresponding operational profiles, determine an intrusion for at least one of the avionics components or systems when the comparison indicates the at least one of the avionics components or systems satisfies an intrusion profile for the at least one of the avionics components or systems, and provide an alert of the determined intrusion.

DESCRIPTION OF EMBODIMENTS OF THE INVENTION

Figure 1:
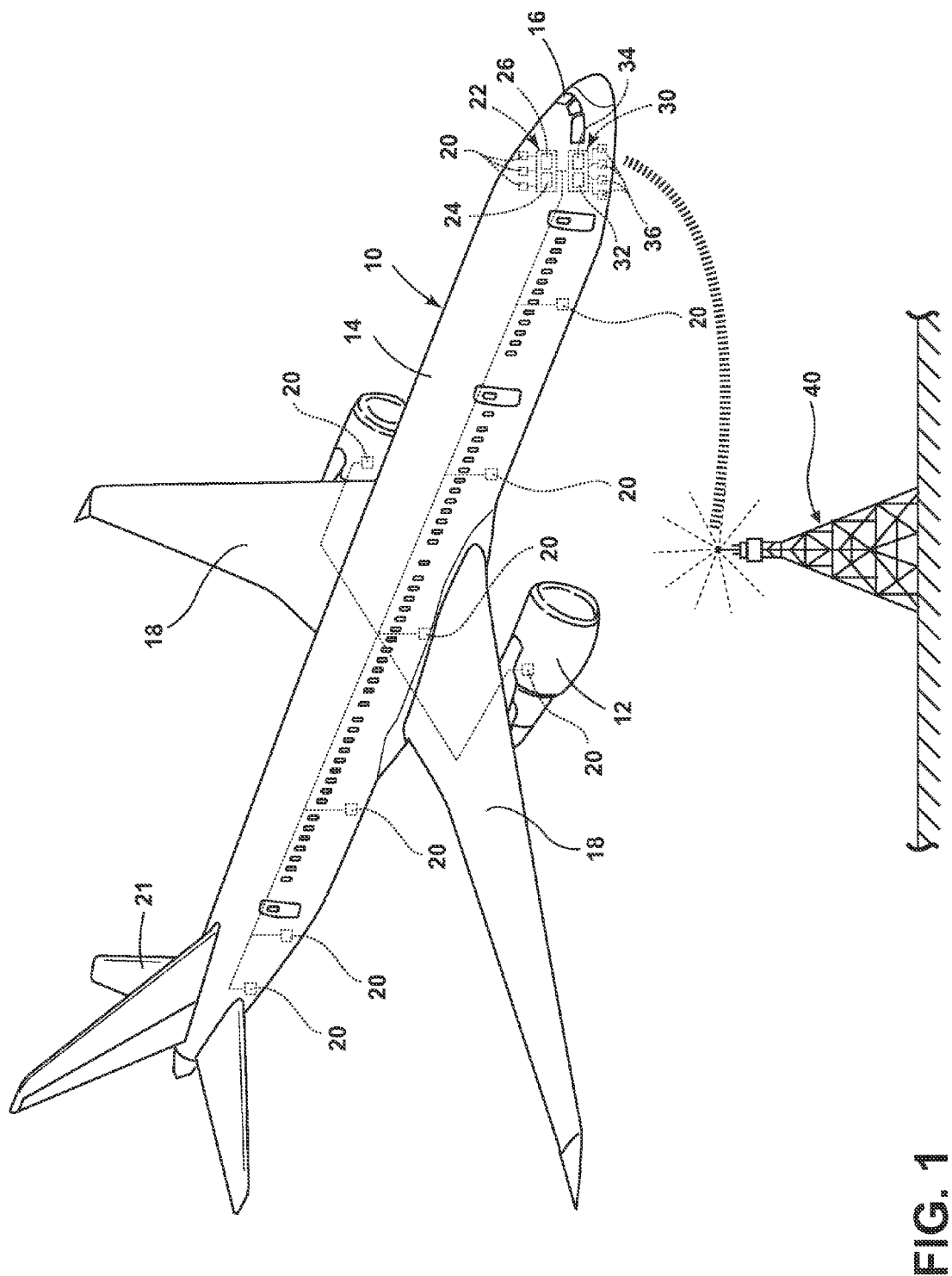
FIG. 1 is a perspective view of an aircraft in which embodiments of the invention may be implemented.

FIG. 1 schematically depicts an aircraft 10 that may execute embodiments of the invention and may include one or more propulsion engines 12 coupled to a fuselage 14, a cockpit 16 positioned in the fuselage 14, and wing assemblies 18 extending outward from the fuselage 14. While a commercial aircraft has been illustrated, it is contemplated that embodiments of the invention may be used in any type of aircraft, for example, without limitation, fixed-wing, rotating-wing, rocket, personal aircraft, and military aircraft.

A plurality of aircraft components and systems 20 that enable proper operation of the aircraft 10 may be included in the aircraft 10. Each of these avionics components and systems may include their own processor and all of them may be connected to a communications network on the aircraft 10. One or more computers or controllers 22, which may be operably coupled to the plurality of aircraft components and systems 20 to control their operation. While only a single controller 22 has been illustrated, it is contemplated that any number of controllers 22 may be included in the aircraft 10. In such an instance, the controller 22 may also be connected with other controllers of the aircraft 10. The controller 22 may include or be associated with any suitable number of individual microprocessors, power supplies, storage devices, interface cards, auto flight systems, flight management computers, and other standard components. For example, the controller 22 may include memory 24, the memory 24 may include random access memory (RAM), read-only memory (ROM), flash memory, or one or more different types of portable electronic memory, such as discs, DVDs, CD-ROMs, etc., or any suitable combination of these types of memory. The controller 22 may also include one or more processors 26, which may be running any suitable programs. The controller 22 may include or cooperate with any number of software programs or instructions designed to carry out the various methods, process tasks, calculations, and control/display functions necessary for operation of the aircraft 10. The controller 22 is illustrated as being in communication with the plurality of aircraft components and systems 20 and it is contemplated that the controller 22 may aid in operating the aircraft components and systems 20 and may receive information from the aircraft components and systems 20.

Further, a system 30 has been illustrated as being included within the aircraft 10. The system 30 may also be operably coupled to any number of the plurality of aircraft components and systems 20 and/or controllers to monitor information therefrom. Monitoring the information may include receiving data therefrom including continuously receive data. Further, this may include that the system 30 may request data from the other avionics systems. This may include that the system 30, the aircraft components and systems 20, and the controller 22 may all be communicably coupled over a communications network, which lets the monitoring system at least receive data from the aircraft components and systems 20 and the controller 22. While illustrated as being separate from the controller 22, the system 30 may also be included in the controller 22 or may be a part of any of the avionics systems 20. The system 30 may include a system that monitors data from multiple components and systems 20 of the aircraft 10. The system 30 may also have a primary avionics and may also include a secondary security purpose wherein the system 30 is configured to compare the monitored data for the at least some of the avionics components and/or systems to corresponding operational profiles, determine an intrusion for at least one of the avionics components and/or systems when the comparison indicates the at least one of the avionics components and/or systems satisfies an intrusion profile for the at least one of the avionics components and/or systems, and provide an alert of the determined intrusion.

By way of non-limiting example, the system 30 may have the primary purpose of health management. Such a health management system 30 has access to information broadcasted from many different components and systems 20 in the aircraft 10. The system 30 may use this information to detect operational failures in the system components for maintenance notification or alerts. Because the system 30 understands the operational nature of the components and systems 20 and has access to data streams that include communication, operational status, state change, and timely performance data, the system 30 may evaluate systems and their performance for signs of malicious acts caused by outside forces.

While the system has been described as a health management system, it may be any suitable system and such a system 30 may be implemented in any suitable software or hardware. For example, the system 30 might include a general-purpose computing device in the form of a computer, including a processing unit 32, a system memory 34, a system bus, which couples various system components including the system memory to the processing unit, etc. The system 30 may include all or a portion of one or more computer programs having executable instruction sets for determining an intrusion of a system or component. The program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general-purpose computer, special purpose computer, or special-purpose processing machine to perform a certain function or group of functions.

The controller 22 or the system 30 may be communicably coupled to any number of communication links 36 to transfer data to and from the aircraft 10. Alternatively, the computer of the system 30 may include a communication management module or be operably coupled to a communication module to provide an alert regarding the intrusion on a component and/or system of the aircraft. It is contemplated that the communication links 36 may be wireless communication links and may be any variety of communication mechanism capable of wirelessly linking with other systems and devices and may include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication is not critical to embodiments of this invention, and later-developed wireless networks are certainly contemplated as within the scope of embodiments of the invention. Further, the communication links 36 may include one or more radios including voice, ACARS-analog, ACARS-digital, SATCOM, Cellular, etc. The communication links 36 may allow for communication with ground controllers or airlines operations center at a ground-based station 40 or with non-ground stations such as satellite (not shown). Further, while only one ground-based station 40 has been illustrated, it will be understood that the aircraft may communicate with multiple ground-based stations 40 utilizing the communication links 36.

During operation, the system 30 may receive data from various components and systems 20 and the controller 22 through a multitude of interfaces including a communication network. This may include that the system 30 may retrieve data and that it may request data be sent to it, including particular types of data. As data is received by the system 30, the system 30 analyzes the data to determine if the data is within acceptable operational parameters. Such an analysis may be based upon predetermined thresholds that are derived from information like life variation, aircraft and part performance, long-term performance, like component comparisons, etc. The system 30 compare the data to the operational profiles to detect uncharacteristic operational profiles indicative of malicious or unintended use of the vehicle component and/or system. The uncharacteristic operational profiles may be thought of as intrusion profiles. The operational profile of the components, systems, and interaction between them may differ during different operational phases. The system 30 may use such operational profile(s) as a baseline to compare the acquired data to. As data is analyzed against the operational profile(s), the system 30 may extend, mature, or modify the profile(s) to better fit the true operational profile(s) of the component and/or system in deployment. This updated profile is then used to identify outliers in the expected operations of the system or components within the system that are indicative of unintended operational use of the system. Some key markers that may be used include unusual communication traffic protocols, uncompliant or unrecognized messages and unusual message payloads, new information sources on the interface, operational phase specific markers, location specific markers and the system 30 may determine intrusions based thereon. The system 30 may then provide an alert such as on a display within the cockpit 16 or the system 30 may transmit the alert or may control the transmission of the alert over the communication links 36 for receipt by one or more ground-based stations 40.

It will be understood that details of environments that may implement embodiments of the invention are set forth in order to provide a thorough understanding of the technology described herein. It will be evident to one skilled in the art, however, that the exemplary embodiments may be practiced without these specific details. The exemplary embodiments are described with reference to the drawings. These drawings illustrate certain details of specific embodiments that implement a module or method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media may be any available media, which may be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, mini-computers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

Figure 2:
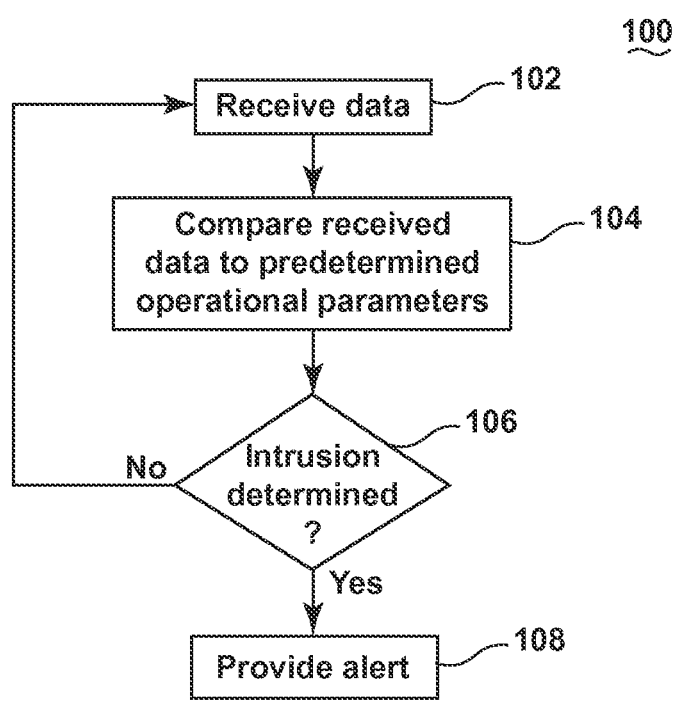
FIG. 2 is a flowchart showing a method of determining intrusion of an avionics component according to an embodiment of the invention.

In accordance with an embodiment of the invention, FIG. 2 illustrates a method 100, which may be used for determining intrusion of an avionics component or system in an aircraft having multiple avionics components or systems communicating over an aircraft communications network monitored by a system. The method 100 begins at 102 by monitoring, by a system such as the system 30, data communication for at least some of the avionics components or systems 20. At 104, the monitored communications for the at least some of the avionics components or systems are compared to corresponding operational profiles. The operational profile may relate to one or more operational parameters and one or more system components or systems or may include acceptable interactions between multiple system components or systems wherein the operational profile relates to a single operational parameter. By way of non-limiting example, a single operational parameter may relate to life variation, aircraft performance, component performance, long-term performance, or like component comparisons. It is contemplated that the operational profile(s) for the various components and systems may differ for each phase of flight.

At 106, an intrusion may be determined for at least one of the avionics components or systems. For example, an intrusion may be determined when the comparison indicates the at least one of the avionics components or systems satisfies an intrusion profile. This may include when the comparison indicates the received data is outside of the operational profile. For example, an intrusion profile may be satisfied when the data is invalid instead of just exceeding operation parameters. Further, the comparison with the operational profile may indicate at least one of unusual message payloads, new information sources, operational phase specific markers, location specific markers and this may also be considered to satisfy an intrusion profile. In this manner, the system may monitor the data streams from multiple avionics systems and components to determine the operational profile of each of the avionics systems and components to see if its operation is sufficiently out of range such that it would indicate tampering. It is contemplated that the system may determine the intrusion in real-time to provide the most benefit of intrusion detection. It is contemplated that the various factors in determining if an intrusion has occurred or what data should be assembled may be an algorithm or computer program comprising a set of executable instructions, which may be executed by the system 30.

If no intrusion is determined, the method may continue to receive data at 102, compare data at 104, and determine if there has been an intrusion at 106. In this manner the receiving, comparing, and determining may be continually repeated. If an intrusion has been determined, an alert of the determined intrusion may be provided at 108. This may include transmitting the alert off the aircraft 10 via the communication link(s) 36. Any suitable communication link 36 may be utilized to transmit the alert. This may include that the alert may be repeatedly transmitted using the same or different communication links 36. Providing the alert may also include transmitting the alert over the communications network of the aircraft and/or providing the alert on a system or display where an operator of the aircraft 10 may be alerted to the detected intrusion. The indication may be provided in any suitable manner at any suitable location including in the cockpit 16. For example, the indication may be provided on a primary flight display (PFD) in a cockpit 16 of the aircraft 10.

It will be understood that the method 100 of determining an intrusion is flexible and the method 100 illustrated is merely for illustrative purposes. For example, the sequence of steps depicted is for illustrative purposes only, and is not meant to limit the method 100 in any way, as it is understood that the steps may proceed in a different logical order or additional or intervening steps may be included without detracting from embodiments of the invention. By way of non-limiting example, the method 100 may also include updating the operational profiles and intrusion profiles based on analysis of the received data. Furthermore, even after an alert has been provided at 108, the method may continue to receive data at 102, compare data at 104, and determine if there has been an intrusion at 106.

Figure 3:
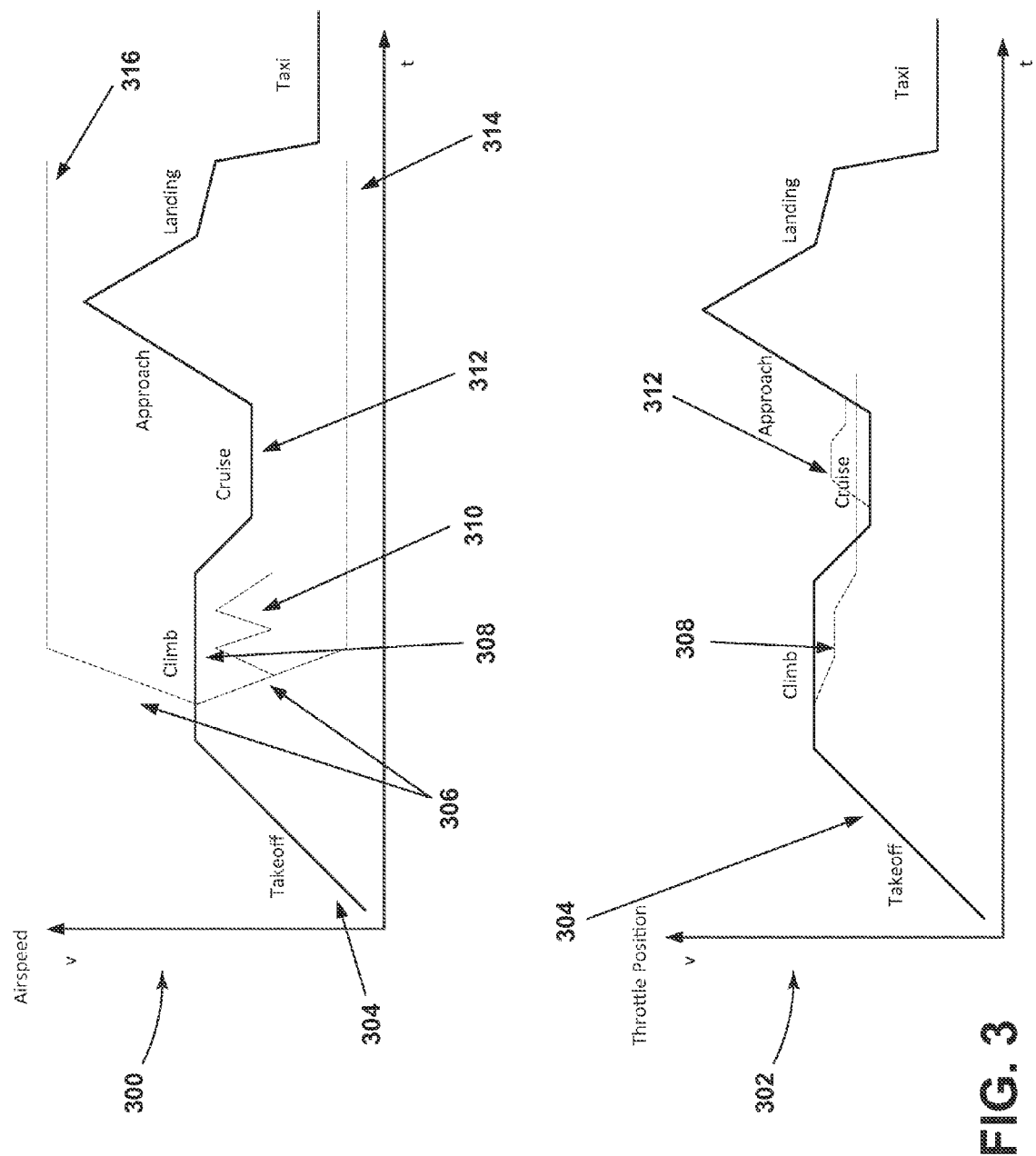
FIG. 3 is a diagram illustrating how an intrusion may be detected according to an embodiment of the invention.

As the operational profile may relate to one or more operational parameters and one or more system components or systems or may include acceptable interactions between multiple system components or systems several example may prove useful. FIG. 3 illustrates operational profiles in the form of an airspeed parameter 300 and a throttle position parameter 302. The parameters 300 and 302 illustrate how two independent data parameters, which should track each other, may be used to detect potential intrusion and data manipulation. In the event that one of the parameters was manipulated, the expected operating range and the correlation of the parameters 300 and 302 may allow the system to detect the intrusion. More specifically, at 304, a normal path for each the parameters 300 and 302 is shown. Such normal paths may be thought of as operational profiles where there are no issues or only expected issues. At 306, there is illustrated a rapid change in airspeed data that is being monitored, which could indicate a rapid decent or dive, which would increase the airspeed absent the throttle, correlation with other sensors would need to be checked (such as the altimeter and control surface inputs), or a failure, which would be isolated to a single sensor. Alternatively, the rapid change may be determined to be an intrusion. At 308, the throttle data deviates from the airspeed data and the system may determine that an intrusion has occurred because data redundancy checks and trend do not match. At 310, sporadic values of the monitored data may indicate sensor failure or an intrusion. At 312, the throttle monitored data deviates from the airspeed monitored data but such a deviation is expected or is within a profile threshold for change so an intrusion would not be determined. At 314, the monitored data could indicate a bad sensor; however, the improper data structure at 316 may indicate either a failed unit or an intrusion, such a determination would need to be verified based on other information.

Figure 4:
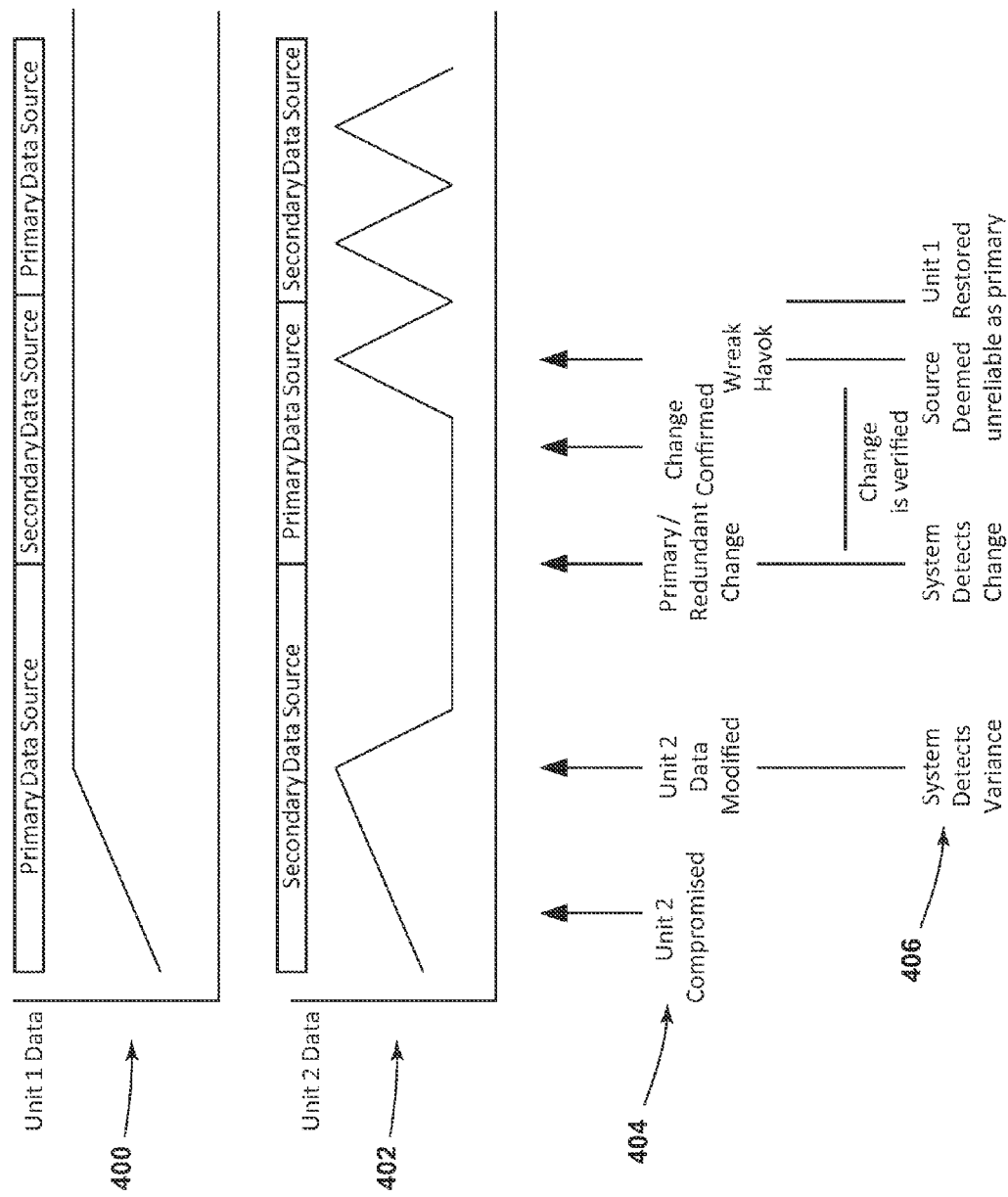
FIG. 4 is a diagram illustrating how an intrusion may be detected according to an embodiment of the invention.

FIG. 4 illustrates a scenario where redundant data sources may be used to detect potential data manipulation and intrusion. More specifically Unit 1 data at 400 and Unit 2 data at 402 are expected to be the same values. In the event that one of the units becomes compromised, such an intrusion may be detected through a comparison between the parameters. By way of non-limiting example, at 404 an intrusion time line is illustrated as well as an intrusion detection time line at 406. The system may determine that Unit 2 data has been manipulated. The system may also note that there was a manual override to use Unit 2 instead of Unit 1. Understanding the sequence of events that has occurred may lead the system to determine that an intrusion has occurred due to the fact that under normal operating scenarios the systems should not be commanded to use what has been determined as unreliable data as its primary data source. The command to use unreliable data would satisfy an intrusion profile.

Figure 5A:
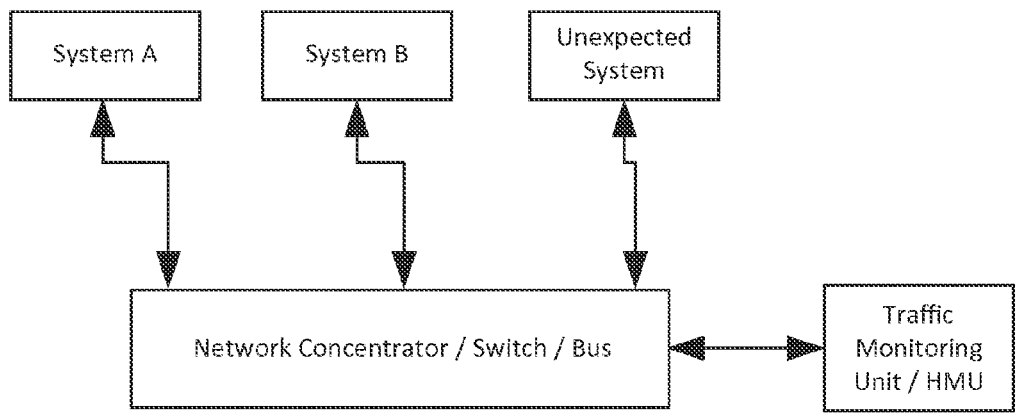
FIGS. 5A-5C are diagrams illustrating several different intrusions that may be detected according to an embodiment of the invention.
Figure 5B:
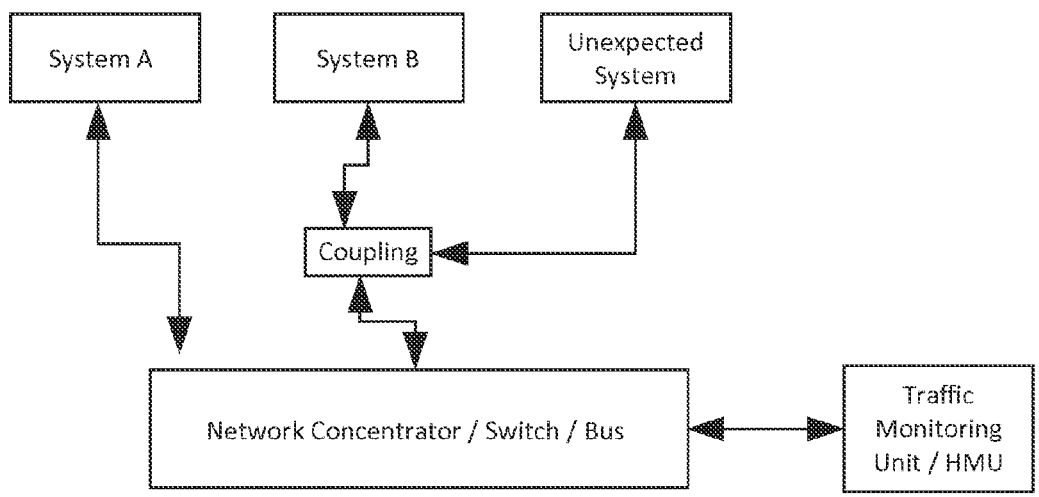
Figure 5C:
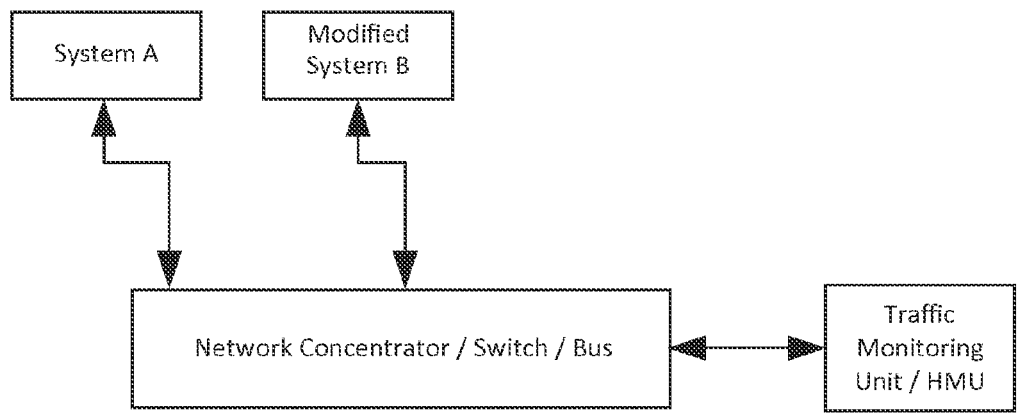

Further still, FIGS. 5A-5C illustrate multiple situations where there is a potential for additional unexpected traffic to be present on a BUS or a system that has been compromised. In an aircraft environment, the network messages and end points should be tightly controlled. Any additional data sources, data messages, or unknown services may be determined to be a security breach and would result in an alert being provided by the system. The system may also be configured to reconfigure the switch to block the routing of the traffic in such an event.

As vehicles become more data intensive, there is a concern that aircraft could be compromised. Contemporary aircraft may be unfit, unequipped, or unable to be made secure due to legacy, complexity, or cost constrains. The above-described embodiments have the technical effect of identifying threats as they occur and providing alerts regarding such intrusions. Rather than distribution of security across many components and systems, which can be costly to maintain, deploy, and manage, the above-described embodiments allow for a system that constantly monitors for security issues in field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining intrusion of an avionics component or avionics system in an aircraft having multiple avionics components and avionics systems communicating over an aircraft communications network monitored by an intrusion system, the method comprising:
    monitoring, by the intrusion system, data communication over the aircraft communications network for one or more of the avionics components or avionics systems;
    comparing, by the intrusion system, the monitored communications for at least one of the avionics components or avionics systems to a corresponding operational profile that includes acceptable interactions between multiple avionics components or avionics systems;
    determining an intrusion for the at least one of the avionics components or avionics systems when the comparison indicates that the at least one of the avionics components or avionics systems satisfies an intrusion profile based on data redundancy checks and trend not matching; and
    providing an alert of the determined intrusion.

2. The method of claim 1 wherein the intrusion is determined by the intrusion system in real-time.

3. The method of claim 1 wherein providing the alert comprises transmitting the alert off the aircraft.

4. The method of claim 1 wherein providing the alert comprises transmitting the alert over the communications network.

5. The method of claim 1 wherein the operational profile comprises acceptable interactions between throttle data and airspeed data.

6. The method of claim 1, further comprising updating the operational profiles and intrusion profiles based on analysis of the monitored data.

7. The method of claim 1 wherein the comparison with the operational profile may indicate at least one of unusual message payloads, new information sources, operational phase specific markers, location specific markers.

8. The method of claim 1 wherein the operational profile differs for each phase of flight.

9. The method of claim 1 wherein the monitoring, comparing, and determining are continually repeated.

10. The method of claim 1 wherein the intrusion profile is satisfied when the comparison indicates the monitored data is outside of the operational profile.

11. An aircraft monitoring system for detecting intrusion into an avionics component or avionics system of an aircraft, which has multiple avionics components and avionics systems, comprising:
a controller monitoring data from multiple avionics components and avionics systems of the aircraft and having a primary avionics purpose and a secondary security purpose wherein the controller is configured to compare the monitored data for the one or more of the avionics components or avionics systems to corresponding operational profiles, determine an intrusion for at least one of the avionics components or avionics systems when the comparison indicates the at least one of the avionics components or avionics systems satisfies an intrusion profile for the at least one of the avionics components or avionics systems, and provide an alert of the determined intrusion and wherein the intrusion profile is satisfied when there is a command to use unreliable data or based on data redundancy checks and trend not matching.

12. The aircraft monitoring system of claim 11, further comprising a communication module operably coupled to the controller and where the communication module is configured to provide an alert regarding the intrusion on a component of the aircraft.

13. The aircraft monitoring system of claim 11 wherein the controller is configured to detect unusual message payloads, new information sources, operational phase specific markers, location specific markers and determine intrusions based thereon.

14. A method of determining intrusion of an avionics component or avionics system in an aircraft having multiple avionics components and avionics systems communicating over an aircraft communications network monitored by an intrusion system, the method comprising:
monitoring, by the intrusion system, data communication over the aircraft communications network for one or more of the avionics components or avionics systems;
comparing, by the intrusion system, the monitored communications for at least one of the avionics components or avionics systems to a corresponding operational profile;
determining from the comparing that the at least one of the avionics components or avionics systems has been commanded to use unreliable data, wherein the commanded use of unreliable data satisfies an intrusion profile;
determining an intrusion for the at least one of the avionics components or avionics systems based on the satisfying of the intrusion profile; and
providing an alert of the determined intrusion.

15. The method of claim 14 wherein the operational profile relates to a single operational parameter.

16. The method of claim 15 wherein the single operational parameter relates to life variation, aircraft performance, component performance, long term performance, or like component comparisons.

17. The method of claim 14 wherein the operational profile relates to multiple avionics components or avionics systems.

\* \* \* \* \*